(12) United States Patent
Sawant

(10) Patent No.: US 11,186,228 B2
(45) Date of Patent: Nov. 30, 2021

(54) STORAGE DEVICE FOR A VEHICLE CAB

(71) Applicant: Volvo Truck Corporation, Gothenburg (SE)

(72) Inventor: Harshad Sawant, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 67 days.

(21) Appl. No.: 16/868,203

(22) Filed: May 6, 2020

(65) Prior Publication Data

US 2020/0353870 A1  Nov. 12, 2020

(30) Foreign Application Priority Data

May 7, 2017 (IN) .............................. 201941018286

(51) Int. Cl.
 B60R 7/04 (2006.01)
(52) U.S. Cl.
 CPC ...................................... B60R 7/04 (2013.01)
(58) Field of Classification Search
 CPC ........................................................ B60R 7/04
 USPC ................................................ 296/37.7, 37.8
 See application file for complete search history.

(56) References Cited

U.S. PATENT DOCUMENTS

| | | | | |
|---|---|---|---|---|
| 1,819,516 A * | 8/1931 | Kelly | ........................ | B60R 7/04 296/37.7 |
| 1,893,624 A | 11/1931 | W. Jay | | |
| 3,494,656 A * | 2/1970 | McIntire | ................ | A47C 17/80 296/156 |
| 3,758,147 A * | 9/1973 | Burton | ...................... | B60P 3/32 296/156 |
| 4,669,773 A * | 6/1987 | LeVee | ....................... | B60P 3/34 292/7 |
| RE33,112 E * | 11/1989 | Durham | .................. | B60R 11/02 296/37.7 |
| 6,851,376 B2 * | 2/2005 | D'Agostino | ........... | A47B 51/00 108/147 |
| 8,393,665 B2 | 3/2013 | Villano et al. | | |
| 8,991,951 B2 | 3/2015 | Lee et al. | | |
| 2008/0164708 A1 | 7/2008 | Hirsch et al. | | |

FOREIGN PATENT DOCUMENTS

| | | |
|---|---|---|
| CN | 208216613 U | 12/2018 |
| CN | 109455131 A | 3/2019 |
| DE | 102014014817 A1 | 4/2016 |

OTHER PUBLICATIONS

Non-Final Office Action for U.S. Appl. No. 16/868,182, dated Oct. 15, 2021, 5 pages.

* cited by examiner

*Primary Examiner* — D Glenn Dayoan
*Assistant Examiner* — E Turner Hicks
(74) *Attorney, Agent, or Firm* — Withrow & Terranova, PLLC

(57) ABSTRACT

A storage device for a vehicle cab, the storage device comprising: a vertically moveable storage unit onto or into which items are intended to be stored; and a support structure configured to support the storage unit and to allow vertical movement of the storage unit between a first/upper position and a second/lower position when the storage device is mounted to a wall or similar, wherein the support structure comprises a spring member arranged to dampen downwards movement and assist upwards movement of the storage unit.

12 Claims, 10 Drawing Sheets

STORAGE DEVICE FOR A VEHICLE CAB

RELATED APPLICATIONS

This application claims priority to Indian patent application number 201941018286, filed May 7, 2019, the disclosure of which is incorporated herein by reference in its entirety.

FIELD OF THE DISCLOSURE

The present disclosure relates to a storage device for a vehicle cab, in particular a storage device for a rear upper storage in a high roof sleepers cab of a truck. The present disclosure also relates to a vehicle provided with such a storage device.

BACKGROUND

Sleeper cabs for trucks are often provided with storage bins arranged high up on a wall close to the ceiling inside the truck cab. In high roof cabs, and in particular for short drivers/users, the accessibility to such storage bins is poor. As a result these storage bins are not frequently used and the space utilization is not efficient.

An example of a vertically adjustable push-pull luggage rack for a passenger car is disclosed in CN208216613, which is incorporated herein by reference in its entirety. The proposed arrangement includes a set of vertically arranged tension gas springs that provides for simplified vertical adjustment of a plate onto which luggage can be placed. Although the solution of CN208216613 might be useful in passenger cars it is not very helpful for storage bins in a high roof truck cab since the vertical distance between the upper and lower positions is not sufficient; it would still be difficult to reach the storage bin even when lowered to its lower position. To simply use longer gas springs would not solve the problem since it then would not be possible to lift the storage bin all the way up close to the ceiling.

There is thus a need for improvements in this field.

SUMMARY

An object of the present disclosure is to provide a storage device for a vehicle cab, in particular a storage device for a rear upper storage in a high roof sleepers cab of a truck, that is easy to use and improves accessibility. Another object is to provide a vehicle cab provided with such a storing device.

The present disclosure concerns a storage device for a vehicle cab, storage device comprising: a vertically moveable storage unit onto or into which items are intended to be stored; and a support structure configured to support the storage unit and to allow vertical movement of the storage unit between a first/upper position and a second/lower position when the storage device is mounted to a wall or similar, wherein the support structure comprises a spring member arranged to dampen downwards movement and assist upwards movement of the storage unit.

The storage device is characterized in that the support structure comprises a scissor linkage mechanism comprising a set of linked, folding linkage elements arranged in an extendable and retractable criss-cross X-pattern with first and second pair of linkage element end parts located at opposite sides of the scissor linkage mechanism, wherein the scissor linkage mechanism is arranged so that, when it is extended or retracted in a longitudinal direction between the opposite sides, a distance between the corresponding linkage element end parts in each pair varies, wherein the scissor linkage mechanism is arranged in a vertical direction of the storage device with the opposite sides forming upper and lower sides and wherein one of the linkage element end parts of the first pair is fixed to a stationary part of the support structure and one of the linkage element end parts of the second pair is fixed to the storage unit so that the scissor linkage mechanism extends or retracts when the storage unit moves vertically in relation to the stationary part of the support structure, wherein a non-fixed linkage element end part in the first or second pair is connected to the spring member and wherein the spring member is arranged so that the linkage element end part connected to the spring member exerts a compression or tension force onto the spring member when the storage unit moves vertically in relation to the stationary part of the support structure.

The length (in the longitudinal direction) of a typical scissor linkage mechanism differs considerably between extended state and retracted state. This difference in distance is much longer than the corresponding difference in the transversal direction between the linkage element end parts within each pair of end parts at the sides/ends of the mechanism. Since the spring member is arranged to handle this transversal movement, which typically is directed horizontally as the scissor linkage mechanism is directed vertically and the linkage element end parts typically (but not necessarily) are aligned horizontally, the spring member can handle a vertical movement of the storage unit that is much larger than if arranged vertically for direct handling of the vertical movement, as disclosed in CN208216613U. The present disclosure thus provides for an improved storage unit movability in the vertical direction. This is particularly useful when the storage device is arranged high up on a wall in a vehicle cab where there is a large distance between floor and ceiling; the storage unit can be located close to the ceiling in its upper position but still allow easy access when lowered to its lower position. Since the inventive storage device allows for the use of a relatively short spring member, it also provides for a more compact storage device, in particular when using a compression spring member (i.e. a spring member that is compressed when the storage unit is moved downwards) that as such requires less space than the tension springs disclosed in CN208216613U and that can be arranged in a space-efficient manner at one of (or both) the opposite sides of the scissor linkage mechanism. The storage device may comprise two scissor linkage mechanisms, typically on a left and right side of the storage unit.

It should be noted that even if the movement handled by the spring member is directed in a particular direction (i.e. horizontally between the pair of linkage element end parts), the spring member does not necessarily have to extend in the same particular direction but can exhibit some angle, e.g. 10-20°, to the particular direction and still function properly (for instance by using a gas spring or arranging a spring coil inside a cylinder to avoid bending).

It may also be noted that scissor linkage mechanisms are well known as such.

In an embodiment the first pair of linkage element end parts are arranged at the upper side of the scissor linkage mechanism. Since the fixed linkage element end part of the first pair is fixed to the support structure this means that at least a part of the support structure, such as a bracket for mounting the storage device, is arranged at the upper side of the scissor linkage mechanism. Although it would be possible to arrange the storage device with the lower side of the scissor linkage mechanism fixed to a lower bracket or similar, it is an advantage to let the storage unit be located close to the fixation to the support structure with the scissor linkage mechanism retracted when the storage unit is in its upper position, which is the normal position of the storage unit when access to the storage unit is not required. Arranged this way the storage device requires less space (as the scissor linkage mechanism is retracted) and the storage unit can more easily be secured (as it is located close to the fixation to the support structure) when access to the storage unit is not required.

In an embodiment the spring member has a first connection point connected to the non-fixed linkage element end part in the first or second pair and a second connection point fixed to the support structure or to the storage unit.

In an embodiment the first connection point and the non-fixed linkage element end part in the first or second pair are attached to a common sliding attachment structure arranged onto the support or storage unit so as to allow for a horizontal sliding movement when the storage unit is moved vertically.

In an embodiment the spring member is a compression spring configured to exert a force when compressed. A compression spring requires less space than a tension spring that would need to be arranged in an opposite direction and would probably extend partly outside the outer boundaries of the storage device.

In an embodiment the spring member is a gas spring. Although coil springs or other types of spring members are useful gas springs are very suitable for the application described here.

In an embodiment the storage device comprises a guide rail arranged to guide vertical movement of the storage unit.

In an embodiment the storage device is arranged so that the storage unit as a whole moves in a vertical direction when the storage unit moves between the first and second positions. Accordingly, the storage unit does not pivot around an axis but is capable of moving as a whole upwards and downwards.

In an embodiment the scissor linkage mechanism comprises at least four linkage elements. That is, the scissor linkage mechanism preferably comprises at least two pairs of linkage elements arranged side by side in the longitudinal direction of the mechanism with end parts of a first pair of linkage elements connected to end parts of a second pair of linkage elements. Although the mechanism can work with just one pair of linkage elements, two or more pairs of linkage elements increases the extension capacity and thus the distance between the first/upper and second/lower positions of the storage unit. The exact design of the scissor linkage mechanism (number of pairs of linkage elements, length of linkage elements, etc.) can be adapted to the particular application.

In an embodiment the storage device comprises a first and a second supporting structure, each provided with at least one corresponding spring member, arranged on opposite sides of the storage unit.

The present disclosure also concerns a vehicle provided with a vehicle cab, wherein the vehicle cab is provided with a storage device according to anyone of the above claims.

In an embodiment of the vehicle, the storage device is arranged onto a wall inside the vehicle cab.

Further advantages and advantageous features of the present disclosure are disclosed in the following description and in the dependent claims.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
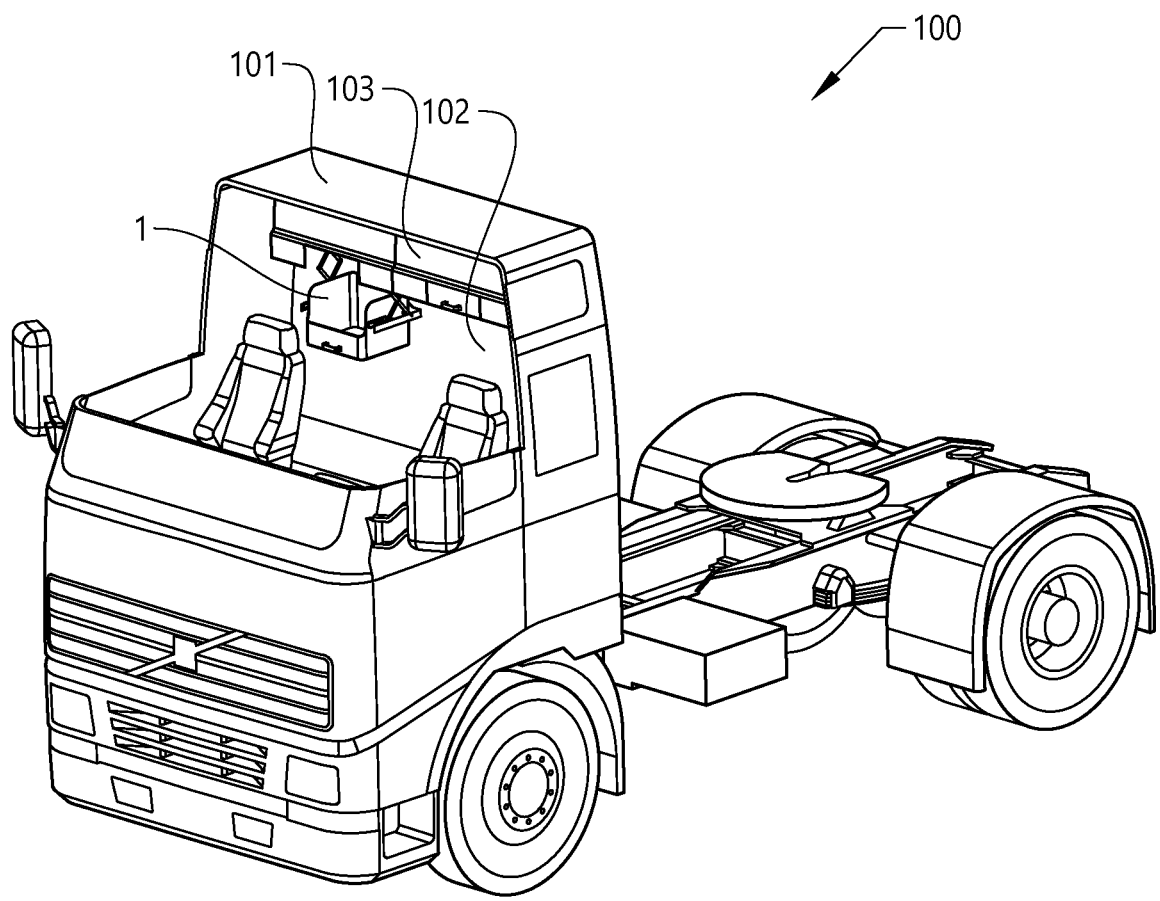
FIG. 1 shows a truck with a sleepers cab provided with a rear upper storage comprising a storage device according to an embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows a truck 100 with a sleepers cab 101 provided with a rear upper storage 103 comprising a storage device 1 according to an embodiment of the present disclosure. The rear upper storage 103 and the storage device 1 are mounted onto a wall 102 inside the cab 101. An upper front portion of the cab 101 has been removed in FIG. 1 to better show the inside (i.e. the upper part of the windshield and the front portion of the roof are not shown in FIG. 1).

Figure 2:
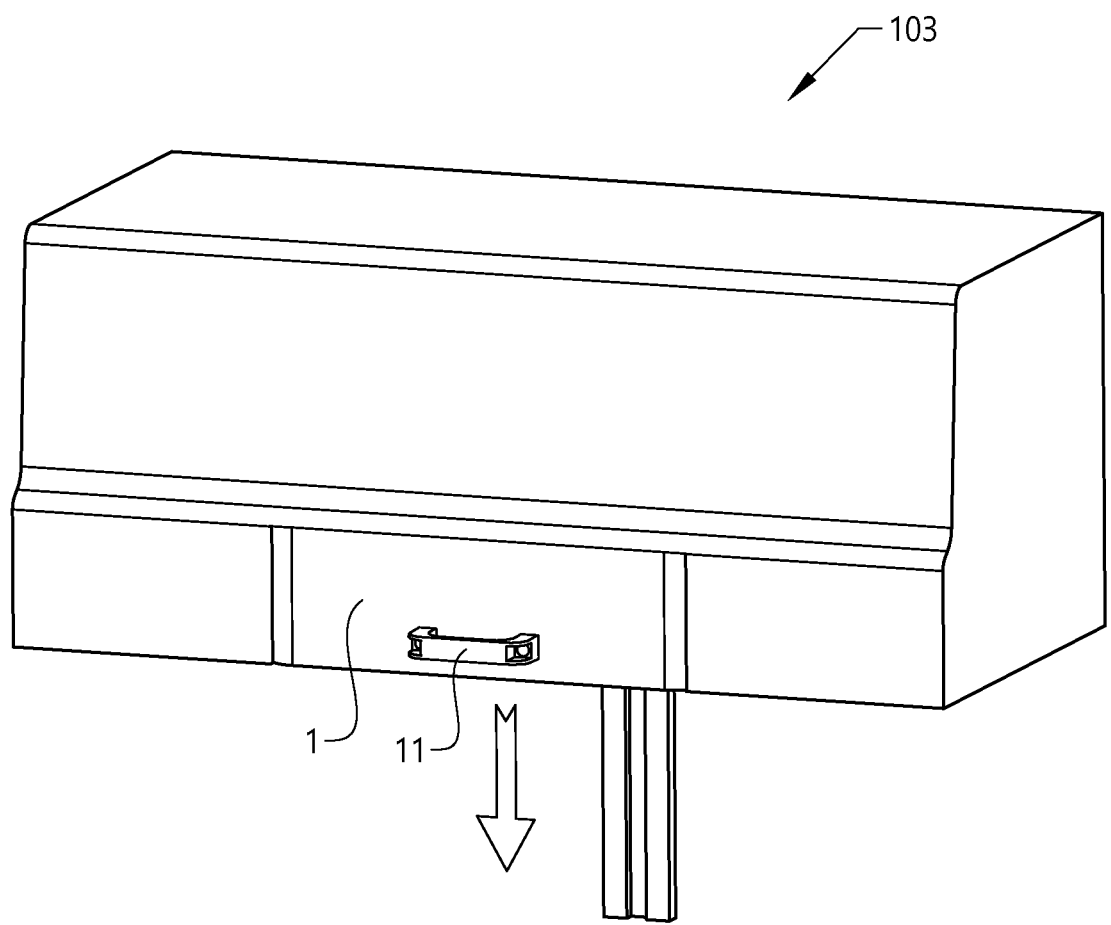
FIG. 2 shows the rear upper storage according to FIG. 1 with the storage device in an upper, retracted position.
Figure 3:
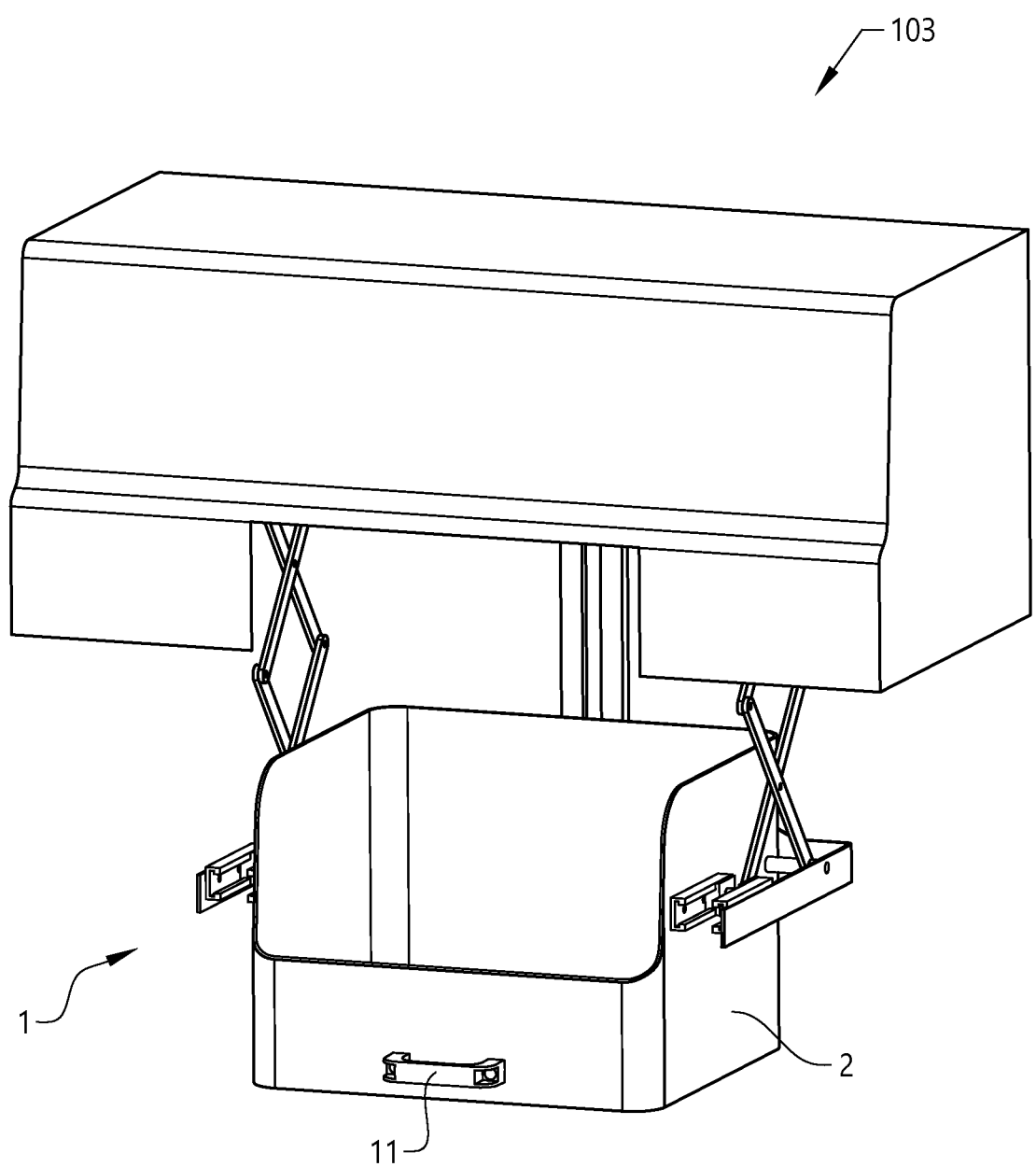
FIG. 3 shows the rear upper storage according to FIG. 1 with the storage device in a lower, extended position.
Figure 4:
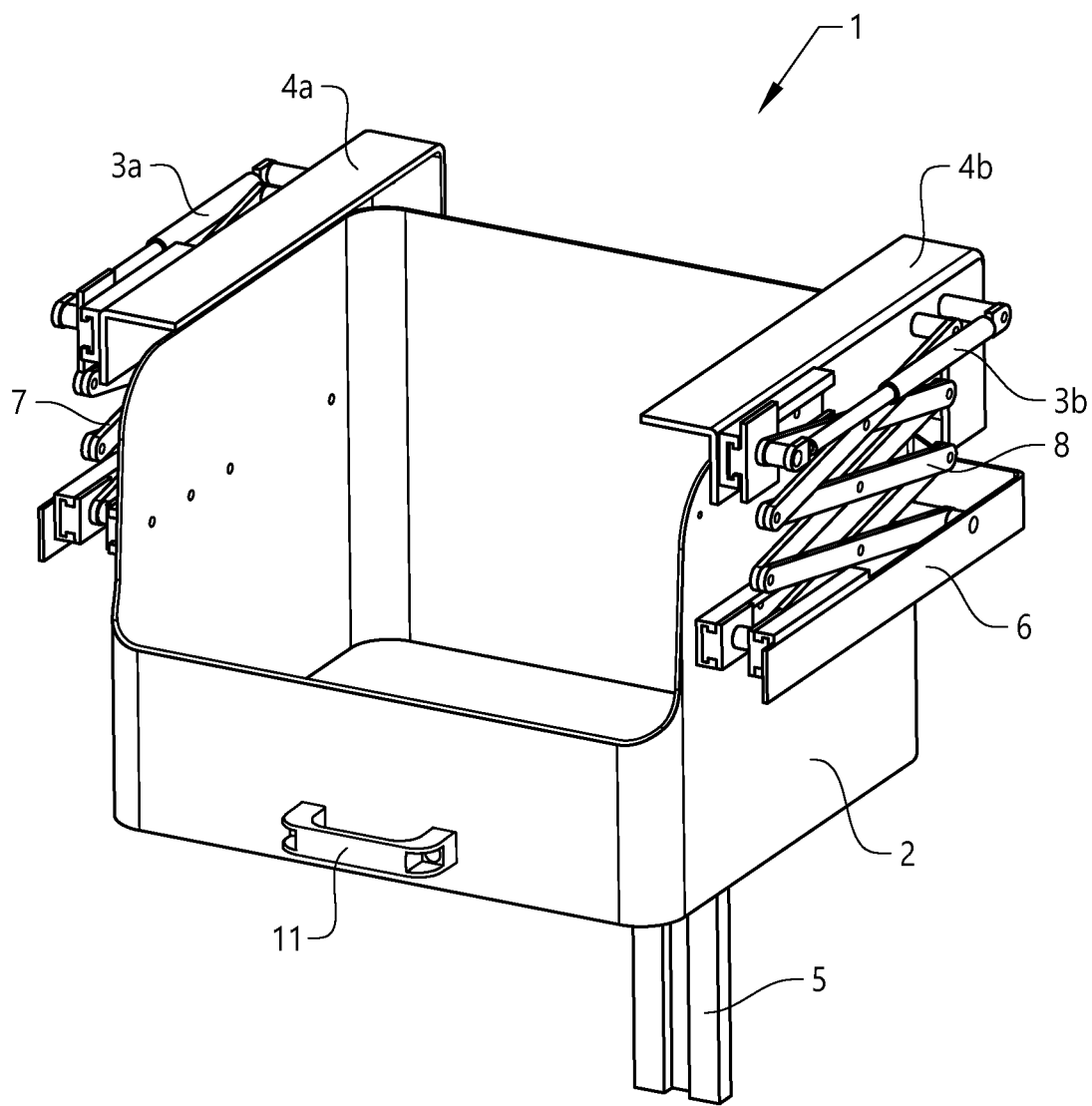
FIG. 4 shows the storage device in an upper, retracted position (same as FIG. 2 but without surrounding rear upper storage).

FIG. 2 shows the rear upper storage 103 according to FIG. 1 with the storage device 1 arranged in an upper, retracted position. FIG. 2 also shows that the storage device 1 is provided with a handle 11 and a guide rail 5 for guiding vertical movement. FIG. 3 shows the rear upper storage 103 according to FIG. 1 with the storage device 1 arranged in a lower, extended position.

As shown in FIGS. 4-10, the storage device 1 comprises a vertically moveable storage unit 2 onto or into which items are intended to be stored and a support structure 4a, 4b, 5, 6, 7, 8 configured to support the storage unit 2 and to allow vertical movement of the storage unit 2 between a first/upper position and a second/lower position when the storage device 2 is mounted to the wall 102. As shown in e.g. FIGS. 5 and 6, the support structure comprises left and right upper brackets 4a, 4b, the guide rail 5 and a support member 6 that extends along the left and rights sides as well as along a backside of the storage unit 2. The support member 6 is fixed to the storage unit 2 and slidably connected to the guide rail 5. The brackets 4a, 4b and the guide rail 5 are intended to be fixed to the wall 102 and these components thus form stationary support members. In contrast, the support member 6 that is fixed to the storage unit 2 moves vertically with the storage unit 2 and is not a stationary support member.

The support structure further comprises first and second compression gas spring members 3a, 3b, one on each side of the storage device 1, each of which being arranged to dampen downwards movement and assist upwards movement of the storage unit 2.

The support structure further comprises first and second scissor linkage mechanisms 7, 8, one on each side of the storage device 1 like the spring members 3a, 3b, each of which comprising a set of linked, folding linkage elements 71, 72, 81, 82, 83, 84 arranged in an extendable and retractable criss-cross X-pattern with first and second pair of linkage element end parts 81a-82a, 83a-84a located at opposite sides 8a, 8b of the corresponding scissor linkage mechanism 7, 8.

In the example shown here the storage device 1 comprises a similar (mirror-reversed) arrangement of spring member 3a, 3b, scissor linkage mechanism 7, 8, etc. on both sides (left and right) of the storage device 1. What is described below for one side (the focus is generally set on the right side below) is generally also valid for the other side. It should be noted, however, that it is not necessary that both sides are arranged in the same way.

Each scissor linkage mechanism 7, 8 is arranged so that, when it is extended or retracted in a longitudinal direction between the opposite sides 8a, 8b, a distance between the corresponding linkage element end parts 81a-82a, 83a-84a (see e.g. FIGS. 6 and 8) in each pair varies. This is a normal function of a scissor linkage mechanism but is given some extra focus here because this property is important for the connection to the spring member 3a, 3b.

Further, each scissor linkage mechanism 7, 8 is arranged in a vertical direction of the storage device 1 (which coincides with the true vertical direction when the device is mounted properly to a vertical wall) with the opposite sides 8a, 8b forming upper and lower sides. One of the linkage element end parts 82a (see e.g. FIG. 8) of the first pair (which in this case forms the upper pair) is fixed to the stationary upper right bracket 4b and one of the linkage element end parts 83a of the second (lower) pair is fixed to the storage unit 2 (see e.g. FIG. 8) so that the corresponding scissor linkage mechanism 8 extends or retracts when the storage unit 2 moves vertically in relation to the stationary upper right bracket 4b (and in relation to other stationary parts of the support structure).

Figure 7:
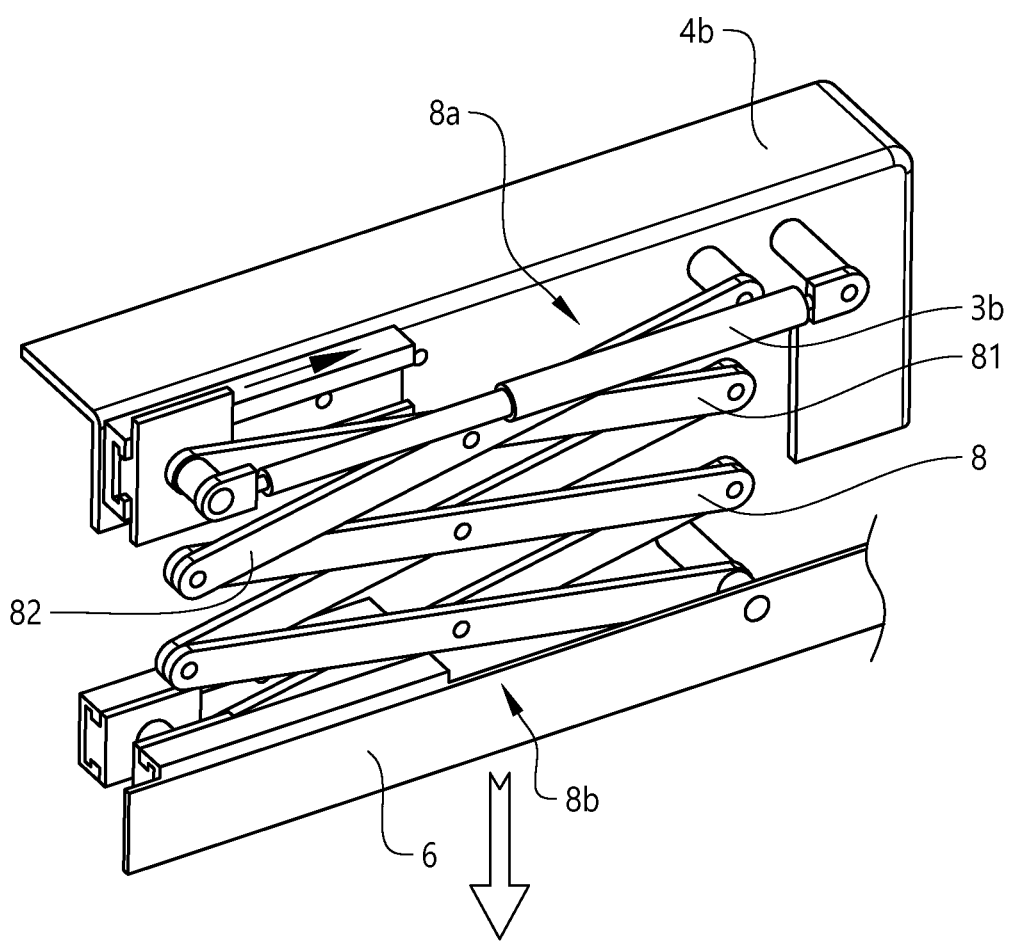
FIG. 7 shows a scissor linkage mechanism in a retracted state.
Figure 8:
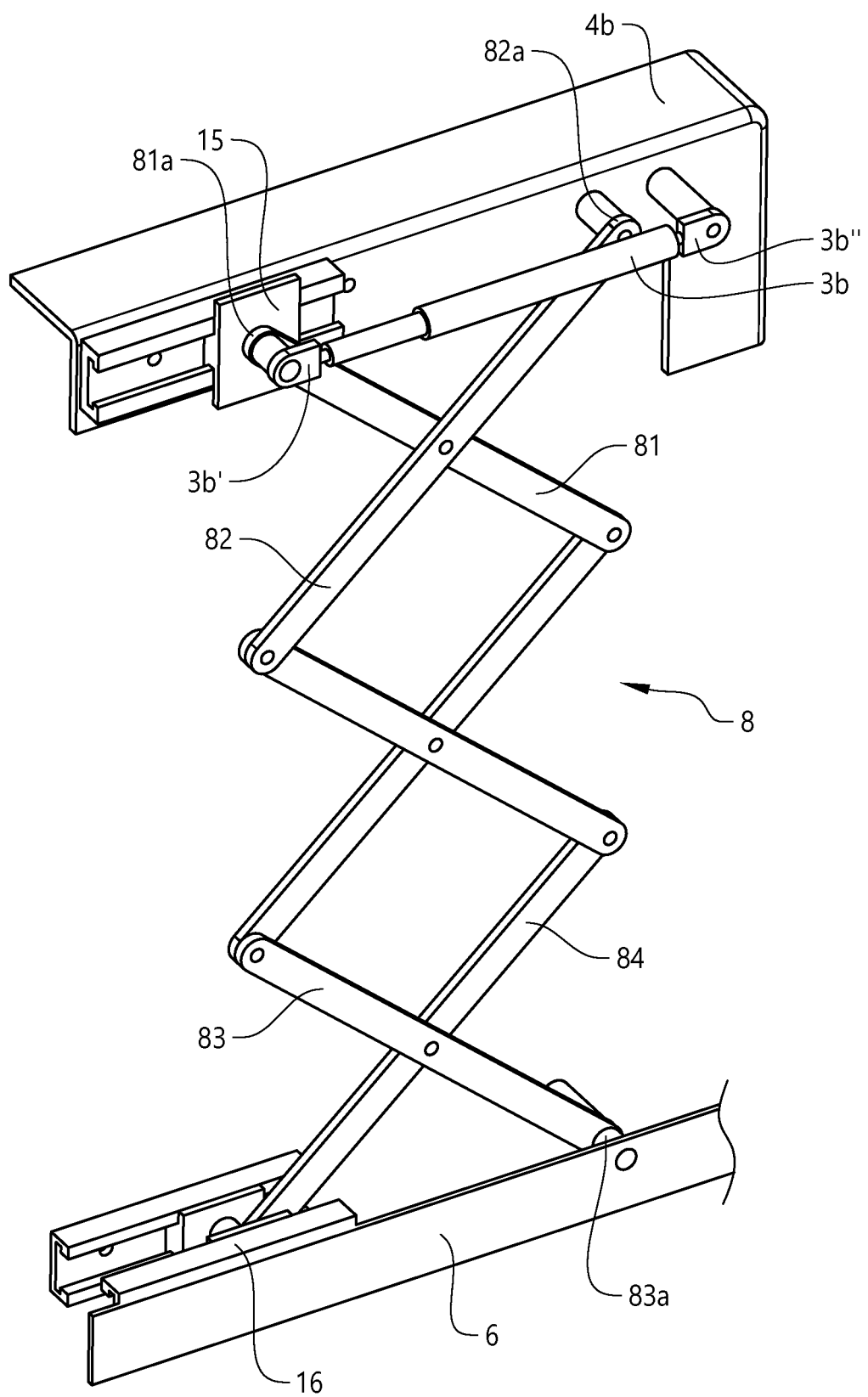
FIG. 8 shows the scissor linkage mechanism of FIG. 7 in an extended state.
Figure 9:
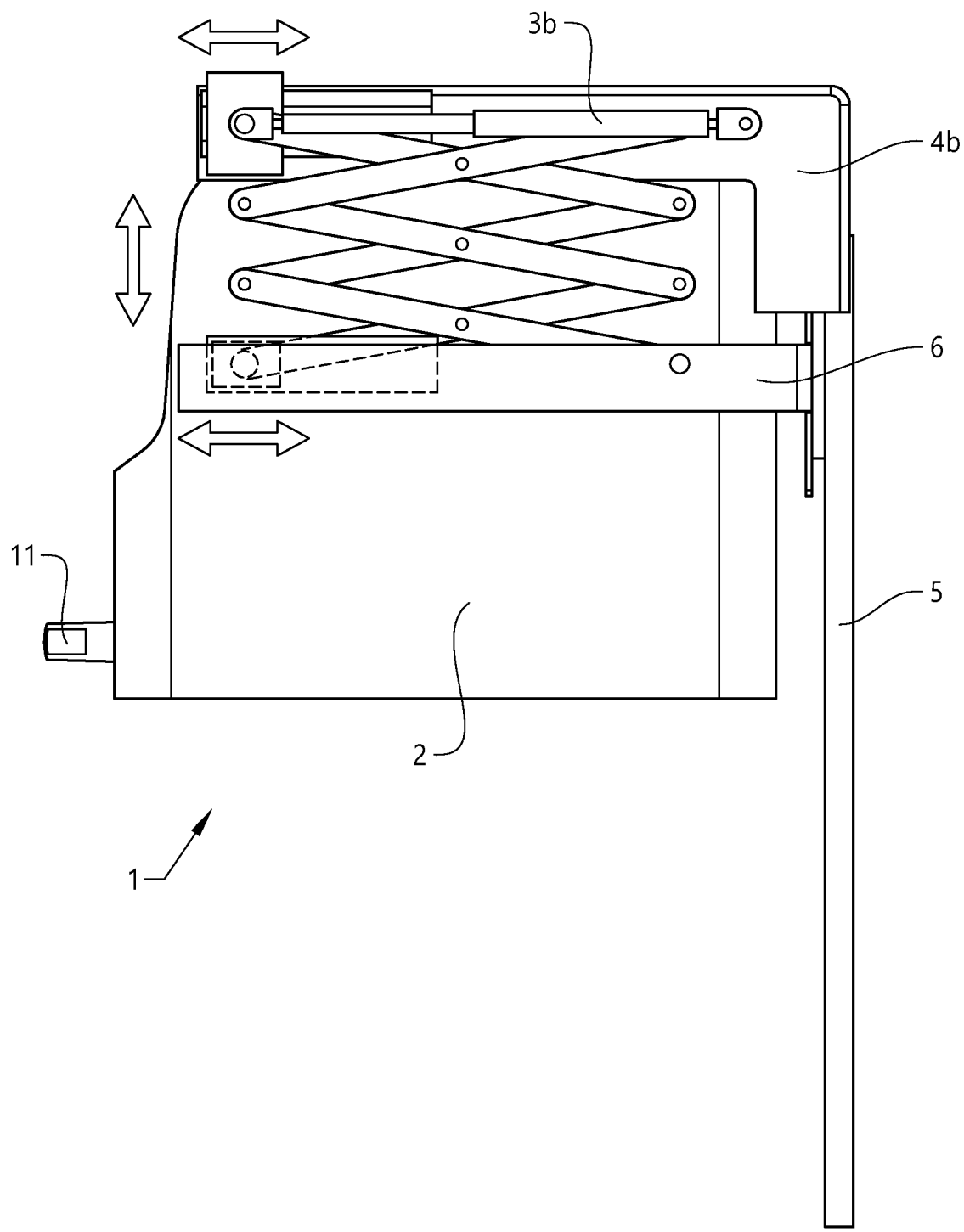
FIG. 9 shows a side view of the storage device according to FIG. 4.
Figure 10:
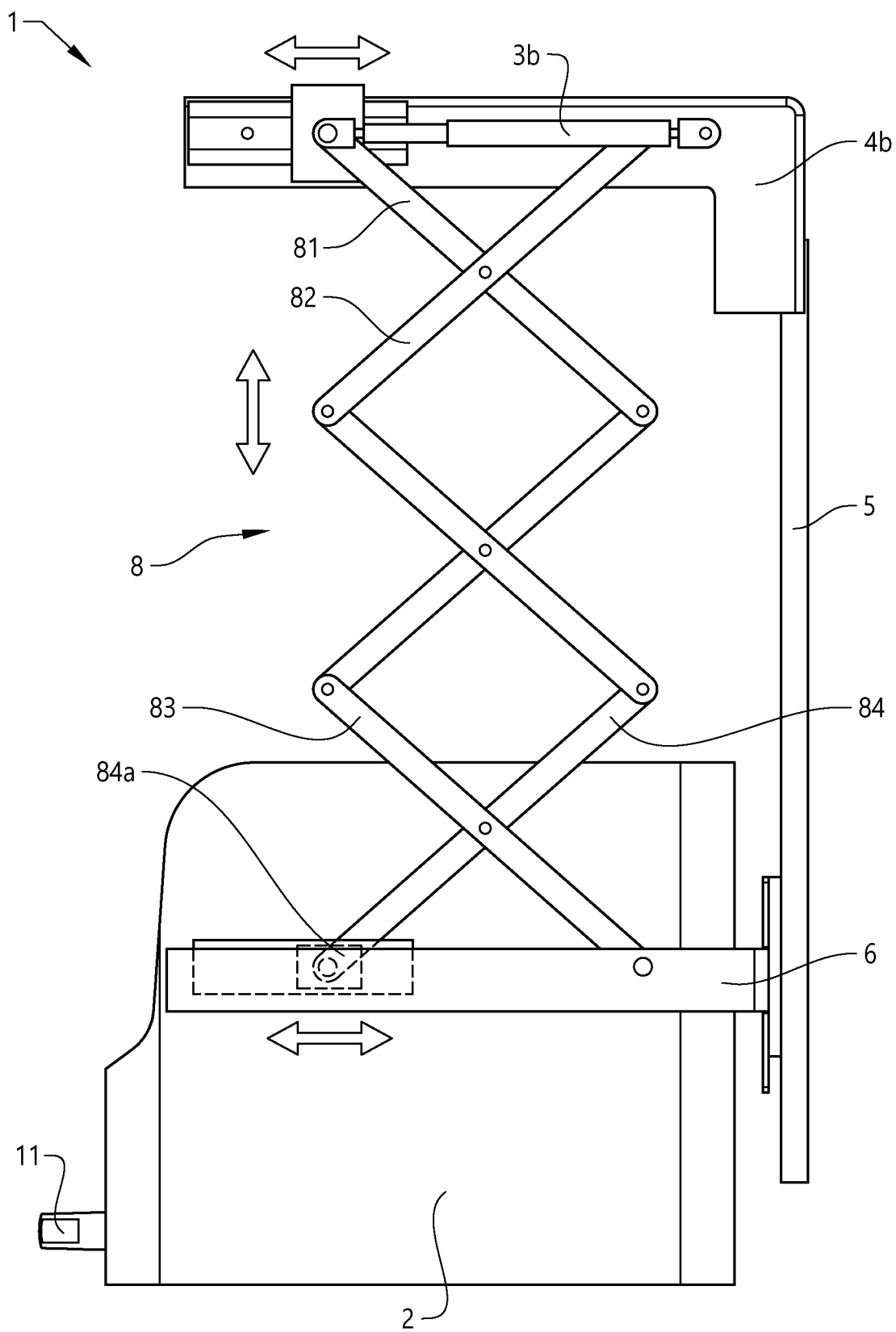
FIG. 10 shows a side view of the storage device according to FIG. 5.

A non-fixed linkage element end part 81a in the first (upper) pair is in this example connected to the spring member 3b and the spring member 3b is in this example arranged so that the linkage element end part 81a connected to the spring member 3b exerts a compression force onto the spring member 3b when the storage unit 2 moves downwards in relation to the stationary parts 4b of the support structure (see FIG. 8, and compare with FIG. 7). The spring member 3b (and the other spring member 3a) dampens during compression downwards movement of the storage unit 2 and assists during expansion upwards movement of the storage unit 2.

The first pair of linkage element end parts 81a, 82a are in this case thus arranged at the upper side 8a of the scissor linkage mechanism 8. The spring member 3b has a first connection point 3b' connected to the non-fixed linkage element end part 81a in the first pair and a second connection point 3b" fixed to the upper right bracket 4b (see FIG. 8)

As shown in e.g. FIGS. 7-8, the first connection point 3b' and the non-fixed linkage element end part 81a in the first pair are attached to a common sliding attachment structure 15 arranged onto the bracket 4b so as to allow for a horizontal sliding movement when the storage unit 2 is moved vertically. A similar second sliding attachment structure 16 is arranged onto the storage unit 2 at the lower side 8b of the scissor linkage mechanism 8 for the non-fixed linkage element end part 84a of the second pair, see FIGS. 8 and 10.

Figure 5:
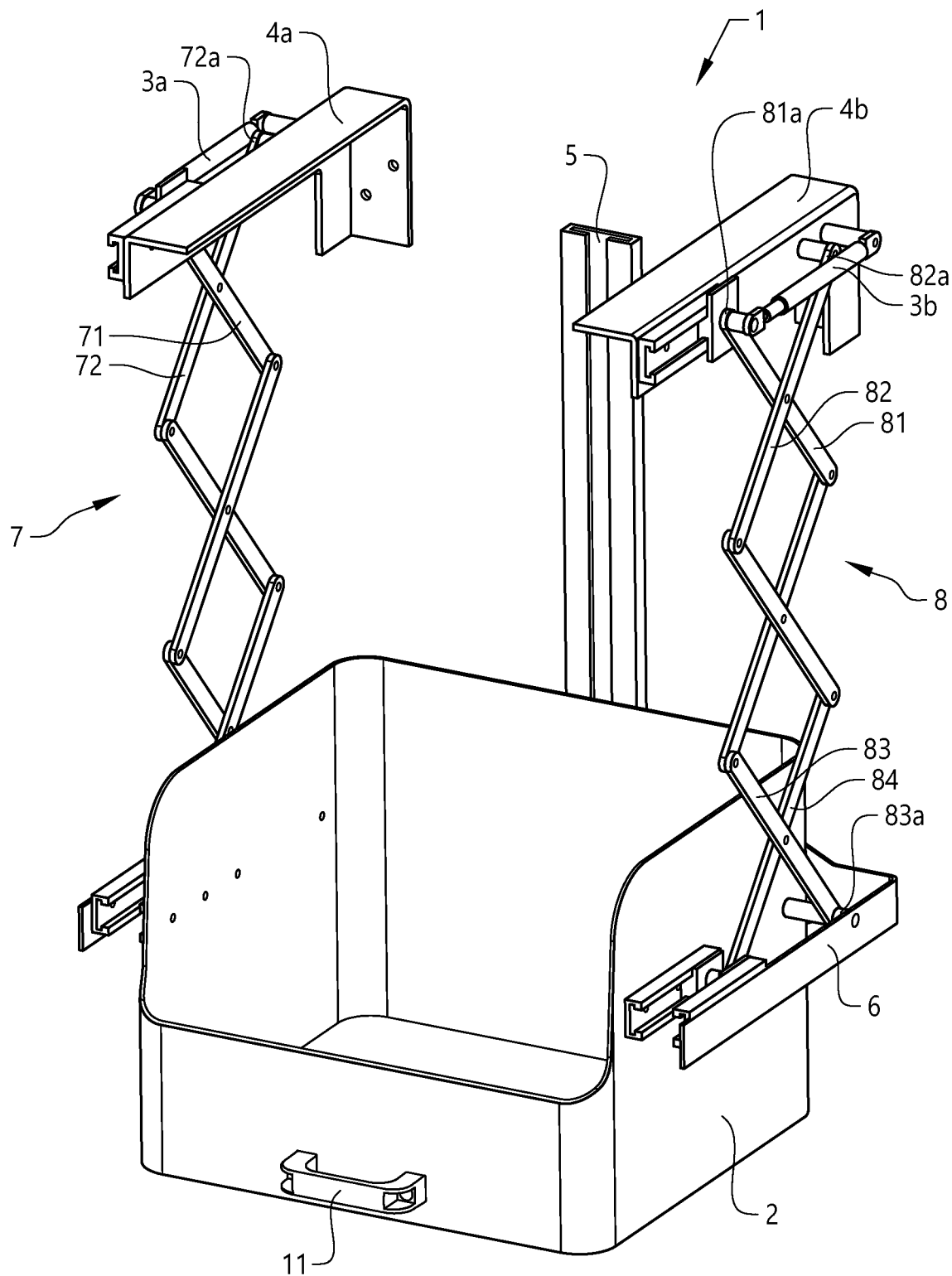
FIG. 5 shows the storage device in a lower, extended position (same as FIG. 3 but without surrounding rear upper storage).
Figure 6:
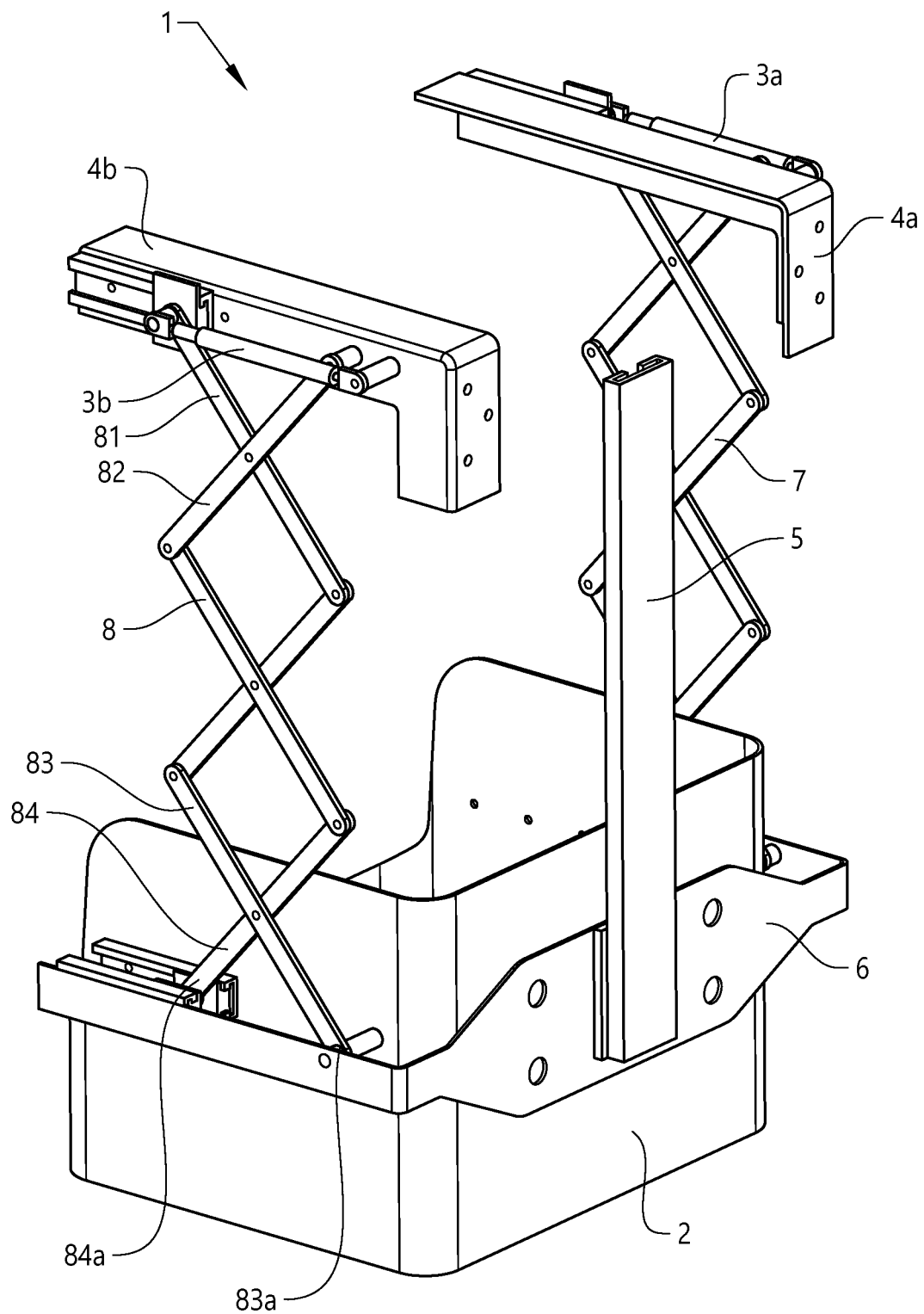
FIG. 6 shows the storage device according to FIG. 5 but in a view showing the backside.

From FIGS. 4-10 it is clear that each scissor linkage mechanism 7, 8 comprises six linkage elements, i.e. three pairs of linkage elements (where 81-82 form one pair and 83-84 form another pair, see e.g. FIG. 5).

It is to be understood that the present disclosure is not limited to the embodiments described above and illustrated in the drawings; rather, the skilled person will recognize that many changes and modifications may be made within the scope of the appended claims. For instance, the spring members 3a, 3b may be arranged at the lower side 8b of the scissor linkage mechanism 8 at the support member 6 instead of at the upper side 8a, or spring members may be arranged both at the upper and lower sides 8a, 8b.

Those skilled in the art will recognize improvements and modifications to the preferred embodiments of the present disclosure. All such improvements and modifications are considered within the scope of the concepts disclosed herein and the claims that follow.

What is claimed is:

1. A storage device for a vehicle cab, the storage device comprising:
   a vertically moveable storage unit onto or into which items are intended to be stored; and
   a support structure configured to support the storage unit and to allow vertical movement of the storage unit between a first/upper position and a second/lower position when the storage device is mounted to a wall or similar;
wherein the support structure comprises a spring member arranged to dampen downwards movement and assist upwards movement of the storage unit,
wherein the support structure comprises a scissor linkage mechanism comprising a set of linked, folding linkage elements arranged in an extendable and retractable criss-cross X-pattern with first and second pair of linkage element end parts located at opposite sides of the scissor linkage mechanism,
wherein the scissor linkage mechanism is arranged so that, when it is extended or retracted in a longitudinal direction between the opposite sides, a distance between the corresponding linkage element end parts in each pair varies,
wherein the scissor linkage mechanism is arranged in a vertical direction of the storage device with the opposite sides forming upper and lower sides and wherein one of the linkage element end parts of the first pair is fixed to a stationary part of the support structure and one of the linkage element end parts of the second pair is fixed to the storage unit so that the scissor linkage mechanism extends or retracts when the storage unit moves vertically in relation to the stationary part of the support structure, and
wherein a non-fixed linkage element end part in the first or second pair is connected to the spring member and wherein the spring member is arranged so that the linkage element end part connected to the spring member exerts a compression or tension force onto the spring member when the storage unit moves vertically in relation to the stationary part of the support structure.

2. The storage device of claim 1, wherein the first pair of linkage element end parts are arranged at the upper side of the scissor linkage mechanism.

3. The storage device of claim 1, wherein the spring member has a first connection point connected to the non-fixed linkage element end part in the first or second pair and a second connection point fixed to the support structure or to the storage unit.

4. The storage device of claim 3, wherein the first connection point and the non-fixed linkage element end part in the first or second pair are attached to a common sliding attachment structure arranged onto the support or storage unit so as to allow for a horizontal sliding movement when the storage unit is moved vertically.

5. The storage device of claim 1, wherein the spring member is a compression spring configured to exert a force when compressed.

6. The storage device of claim 1, wherein the spring member is a gas spring.

7. The storage device of claim 1, wherein the storage device comprises a guide rail arranged to guide vertical movement of the storage unit.

8. The storage device of claim 1, wherein the storage device is arranged so that the storage unit as a whole moves in a vertical direction when the storage unit moves between the first and second positions.

9. The storage device of claim 1, wherein the scissor linkage mechanism comprises at least four linkage elements.

10. The storage device of claim 1, wherein the storage device comprises a first and a second scissor linkage mechanism, each provided with at least one corresponding spring member, arranged on opposite sides of the storage unit.

11. A vehicle provided with a vehicle cab, wherein the vehicle cab is provided with a storage device, the storage device comprising:
   a vertically moveable storage unit onto or into which items are intended to be stored; and
   a support structure configured to support the storage unit and to allow vertical movement of the storage unit between a first/upper position and a second/lower position when the storage device is mounted to a wall or similar;
wherein the support structure comprises a spring member arranged to dampen downwards movement and assist upwards movement of the storage unit,
wherein the support structure comprises a scissor linkage mechanism comprising a set of linked, folding linkage elements arranged in an extendable and retractable criss-cross X-pattern with first and second pair of linkage element end parts located at opposite sides of the scissor linkage mechanism,
wherein the scissor linkage mechanism is arranged so that, when it is extended or retracted in a longitudinal direction between the opposite sides, a distance between the corresponding linkage element end parts in each pair varies,
wherein the scissor linkage mechanism is arranged in a vertical direction of the storage device with the opposite sides forming upper and lower sides and wherein one of the linkage element end parts of the first pair is fixed to a stationary part of the support structure and one of the linkage element end parts of the second pair is fixed to the storage unit so that the scissor linkage mechanism extends or retracts when the storage unit moves vertically in relation to the stationary part of the support structure, and
wherein a non-fixed linkage element end part in the first or second pair is connected to the spring member and wherein the spring member is arranged so that the linkage element end part connected to the spring member exerts a compression or tension force onto the spring member when the storage unit moves vertically in relation to the stationary part of the support structure.

12. The vehicle of claim 11, wherein the storage device is arranged onto a wall inside the vehicle cab.

* * * * *